Nov. 8, 1932.　　　T. E. MURRAY, JR　　　1,886,830
MANUFACTURE OF RADIATORS
Filed Jan. 25, 1930　　　3 Sheets-Sheet 1
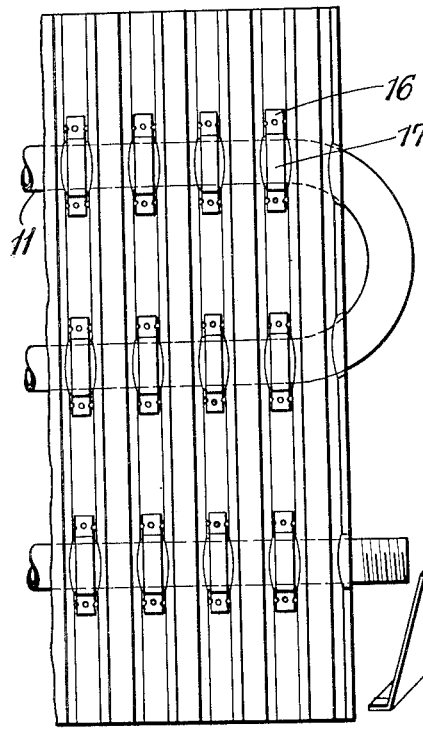
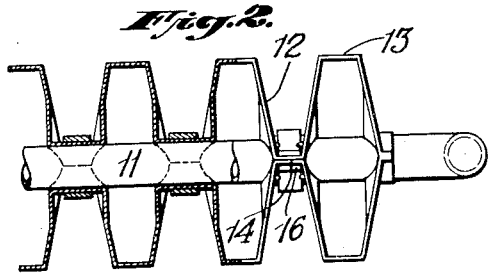
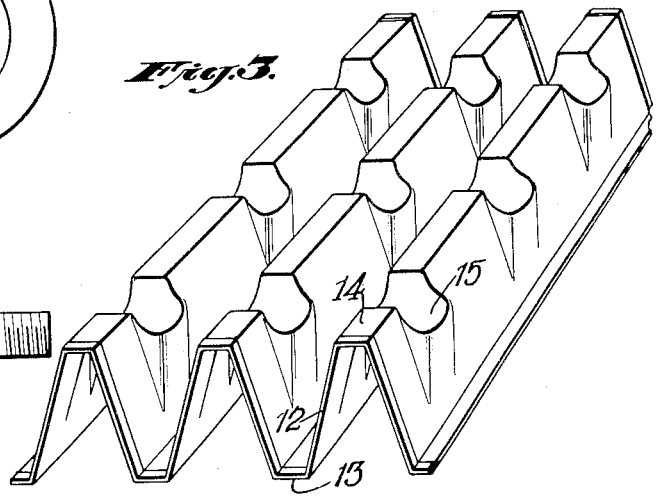
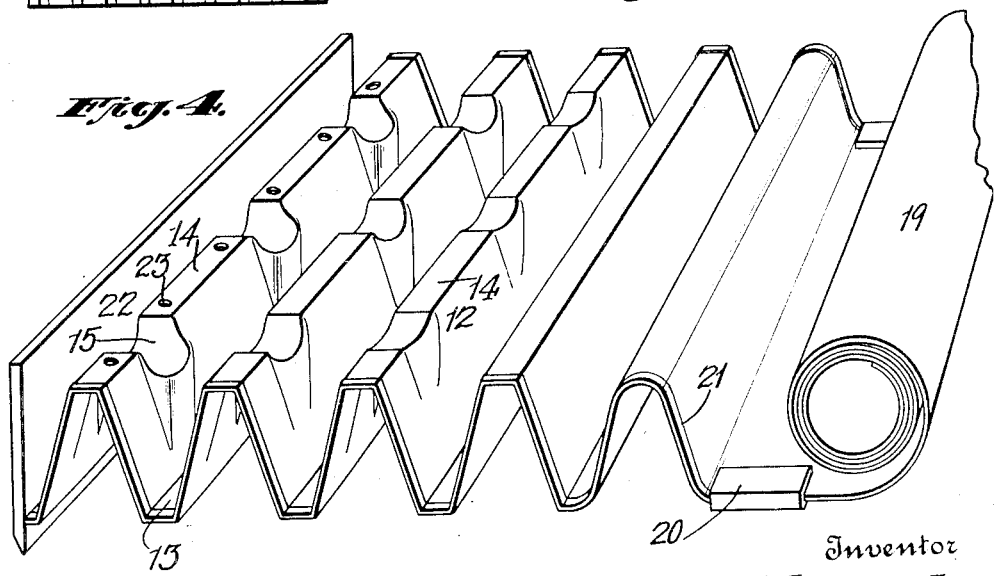
Inventor
THOMAS E. MURRAY Jr.
By his Attorneys

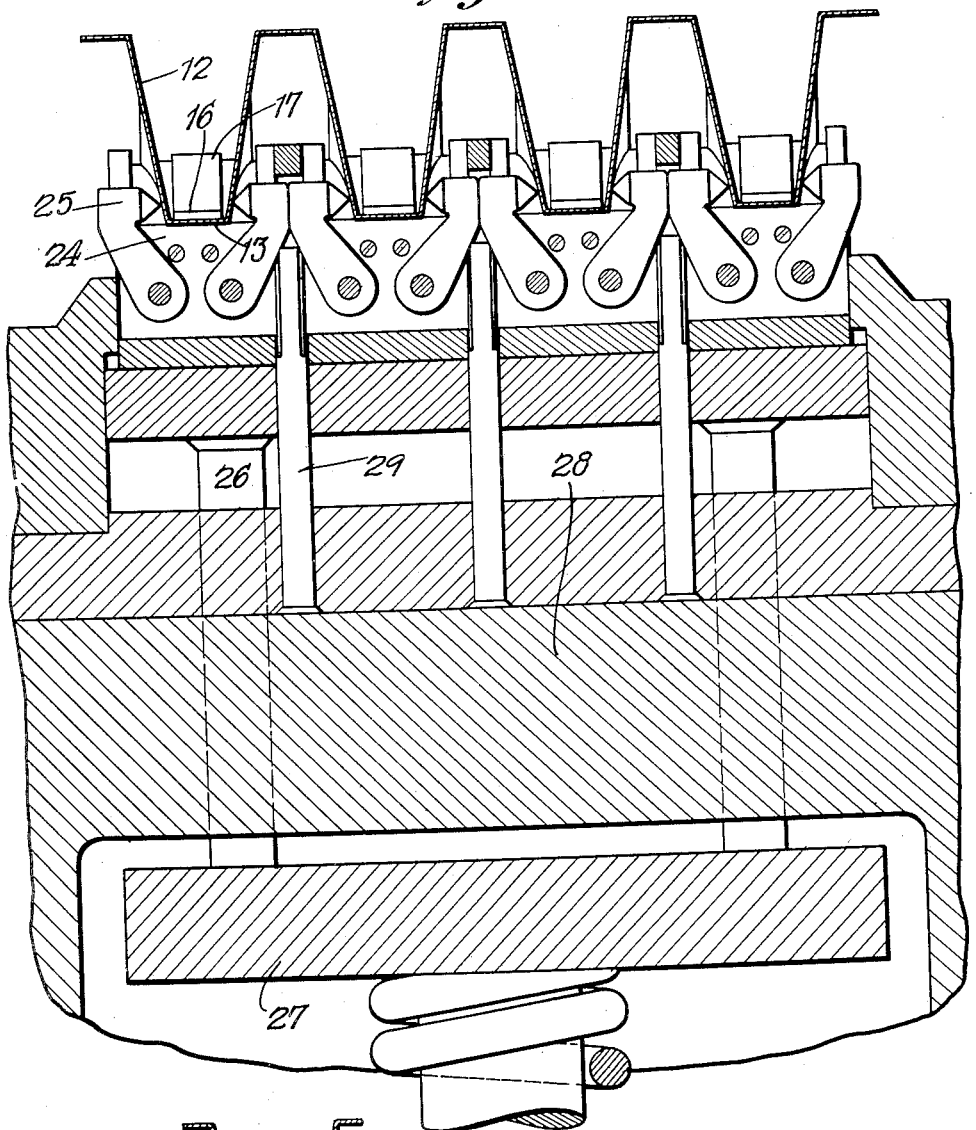
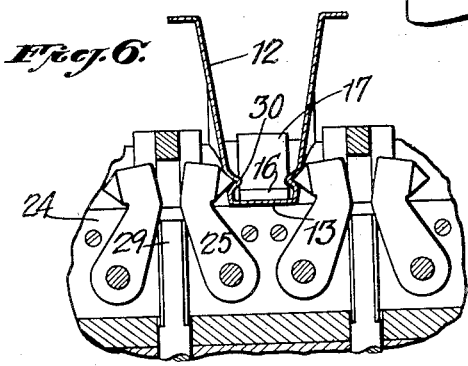

Nov. 8, 1932.  T. E. MURRAY, JR  1,886,830
MANUFACTURE OF RADIATORS
Filed Jan. 25, 1930  3 Sheets-Sheet 3
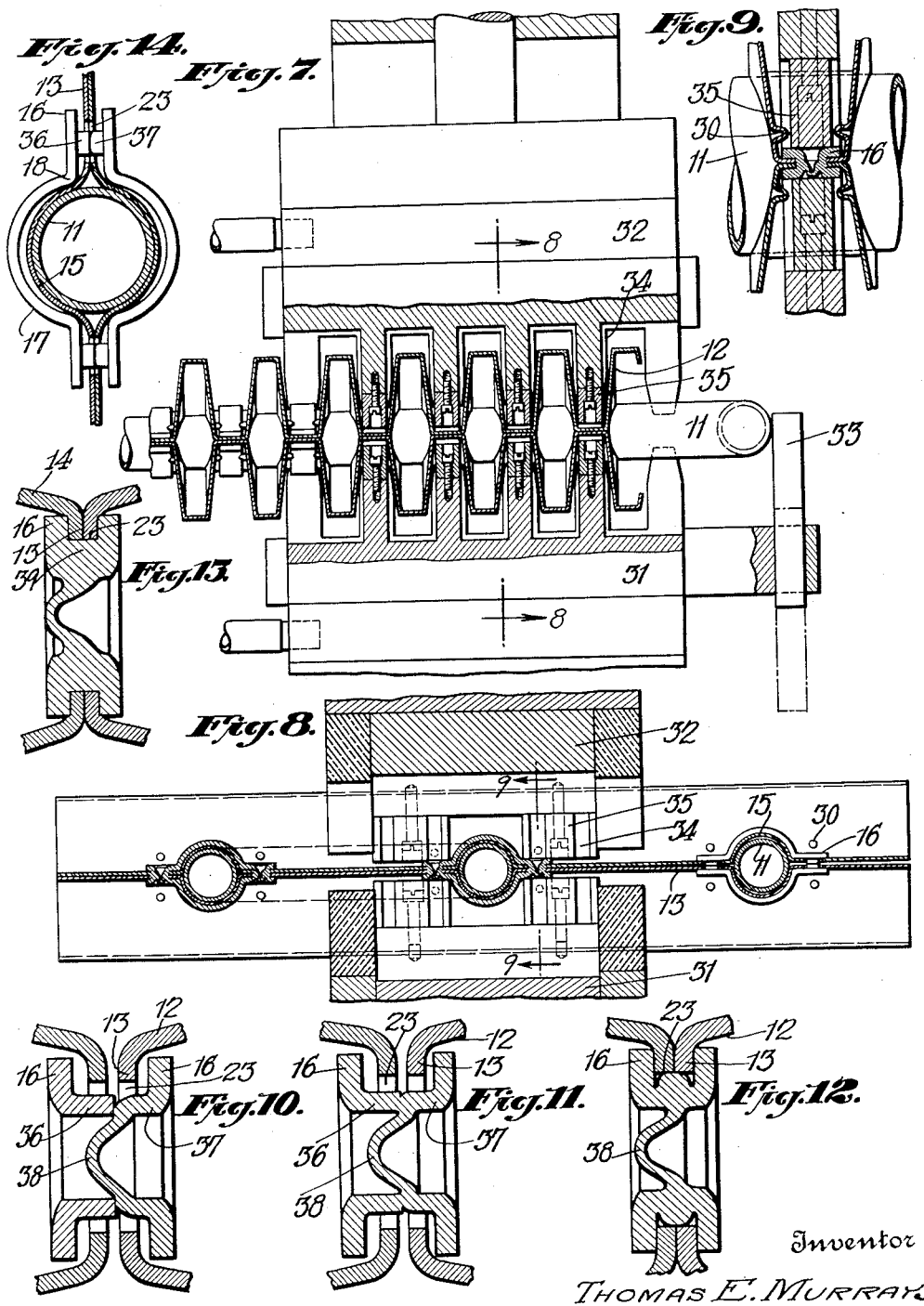
Inventor
THOMAS E. MURRAY JR.
By His Attorneys Patented Nov. 8, 1932

1,886,830

UNITED STATES PATENT OFFICE

THOMAS E. MURRAY, JR., OF BROOKLYN, NEW YORK, ASSIGNOR, BY MESNE ASSIGNMENTS, TO AMERICAN RADIATOR & STANDARD SANITARY CORPORATION, A CORPORATION OF DELAWARE

MANUFACTURE OF RADIATORS

Application filed January 25, 1930. Serial No. 423,330.

The invention aims to provide an improved method of producing economically a certain type of radiators and similar structures. In a previous application of Phelps, No. 305,652, filed September 13, 1928, there is described a machine and process by which the welding operations forming part of the present process can be performed.

The accompanying drawings illustrate a process of practicing the invention.

Fig. 1 is a side elevation of one end of a radiator. Fig. 2 is a plan of the same, partly in section. Fig. 3 is a perspective view of a finished corrugated plate. Fig. 4 is a similar view of a plate in process of corrugating and recessing. Fig. 5 is a vertical section of a device for holding certain straps in place on a corrugated sheet. Fig. 6 is a partial view of the same in advanced position. Fig. 7 is a vertical section through the assembling and welding devices. Fig. 8 is a section on the line 8—8 of Fig. 7. Fig. 9 is a section on the line 9—9 of Fig. 8. Figs. 10, 11, 12 and 13 are sections of different stages showing certain welding projections. Fig. 14 is a vertical section through a pair of joints assembled but not completely fastened.

As shown in Figs. 1 and 2 the radiator comprises a heating element consisting of a tube 11, preferably of thin copper and extending lengthwise in one or more sections; to which is applied a pair of corrugated sheets which may also be of thin copper or may be of other conductive material for heating an extended area exposed to the air. These sheets are corrugated to provide fins 12 extending transversely to the length of the tube. The outer edges of the corrugations are broadened to form longitudinal plates 13 and the inner edges similarly shaped to provide longitudinal portions 14. The plates 14 of the opposite sheets preferably meet above and below the tube, but in some designs of radiator they are separated. As shown more clearly in Fig. 3 the inner portions of the corrugations are bent to form a series of recessed portions 15 in longitudinal alinement. Straps 16 (Fig. 14) have recessed portions 17 fitting over the portions 15 of the sheets and have projections 36, 37 which pass through holes in the sheets; the projections of the opposite straps being held together as hereinafter described.

The sheets may be shaped rapidly and economically in the manner shown in Fig. 4. A roll 19 of thin sheet copper has its forward edge passing first through folders indicated diagrammatically at 20 which double the edge over as at 21 to provide a rounded edge which is thus stiffened. This also protects the hands of the workmen against being cut by the sharp edges. In one or more successive bending operations the corrugations are formed and the portions 14 bent inward to form the recesses 15. A shear indicated diagrammatically at 22 is operated at suitable intervals to cut off a length of the finished sheet having as many complete corrugations as are necessary for the length of the radiator to be produced. In the last shaping operation, or in a subsequent operation on the completely bent sheet, holes 23 are punched in the portions 13 at points shortly above and below the recesses 15.

The straps are applied to the sheets loosely and temporarily in the manner shown in Figs. 5 and 6. The sheet is placed on a table 24 with the portions 13 resting on the table and with the straps 16 resting on these plates. Pivoted punches 25 are mounted on the plates with pointed ends engaging the transverse portions 12 of the sheets just above the end portions of the straps.

The table 24 is carried on columns 26 resting on a plate 27 supported by a spring. A fixed portion 28 of the machine carries uprights 29 each of them fitting at its upper end between a pair of the pivoted punches 25 and serving as a cam to separate them and force their points into the corrugated sheet. Downward pressure on the straps forces down the table 24 (Fig. 6) and causes the cams 29 to actuate the punches 25 to form bends 30 in the corrugated sheet overlying the straps 16 and holding the latter loosely in place.

Two such sheets are then assembled with the tube lying in the recesses between them as shown in Figs. 7, 8 and 9. They are supported on a lower electrode carrier 31 and pressed down by an upper electrode carrier 32, the respective carriers being connected to opposite ends of the circuit carrying the welding current. A sliding removable stop 33 engages an end of the tube 11 and fixes the longitudinal position thereof. The carriers 31 and 32 have projecting portions 34 which fit in the corrugations of the sheets and hold the latter in place. The four central projections carry copper electrodes 35 on their ends shaped to pass between the projections 30 (Fig. 9) and to bear on the ends of the straps 16. The pressing down of the upper electrode and the passing of the welding current between the electrodes and through the joint welds the straps firmly together. When the first four joints (or lines of joints if the tube is in several sections) are welded the upper electrode is lifted and the assembled structure is shifted to bring the next four joints under the welding electrode. This second welding operation is carried on as before. These operations are repeated as many times as required by the length of the radiator. For a short radiator or with a large enough welding machine one operation may cover all the joints. The three horizontal lines of joints shown in Fig. 1 (or as many horizontal lines of joints as there may be) may be welded at one operation with the machine. Or the machine may be designed to weld only one line of joints at a time.

The straps are provided with projections of special shape and the welding is accomplished in a certain way to secure a quick and easy operation and also a very rigid connection of all the parts. The straps 16 have projections 36, 37, Fig. 10. The projections 36 are recessed, and the projections 37 have extended points 38 which enter the projections 36 and center or register the two together. The end of the projections 36 bears squarely on a shoulder of the projection 37.

When a welding current is passed, the contacting edges are softened and the continued pressure forces the parts together, first to the position of Fig. 11 and then to the position of Fig. 12. In this position it will be observed that the parts 13 of the corrugated sheet are pressed together, but the metal extruded at the welded joint does not quite fill the holes 23 in the plates 13. To effect this, the pressure is continued while the metal is still soft, after the welding current is cut off. The result is shown in Fig. 13 in which the straps 16 are forced slightly into the plates 13 and the welded projections are swaged to form a sort of rivet 39 completely filling the holes in the plates and tightly fastening the straps to the plates.

The straps are of the form shown in Fig. 14, designed to stretch the recessed portions 15 of the sheet tightly about the tube 11. The angles 18 of the straps, where the recessed portions join the straight end portions are of less radius than the corners of the sheet against which they bear. Consequently when the opposite straps are pressed together they draw the sheet tightly around the tube by stretching it at these points.

Although the recesses which receive the tubes are made at one side of each sheet for radiators of the type described, there are other types in which a corrugated sheet will be used with similar recesses on both sides. For example, there are radiators in which two or more pipes are arranged horizontally alongside of each other, with a single corrugated plate between each pair of pipes as well as a corrugated plate on the outside. Such radiators have been found particularly useful in connection with refrigerating apparatus for condensing the refrigerant.

The invention is applicable to the production of radiators of this type and other types as well as the type illustrated, and in referring to the making of recesses at one side of the corrugated sheets, the making of such recesses at both sides of a sheet is included.

Various modifications in detail and in the order of the steps may be made without departure from the invention as defined in the following claims:

1. The method of making radiators of the character described which comprises forming metal sheets into spaced corrugated sections and bending the edges of the corrugated sections at one side to form a series of recesses in longitudinal alinement, applying straps to the sheets at the sides opposite to the recesses, assembling two such sheets with their recesses facing each other and an elongated heating element between them extending longitudinally in said recesses, bringing the assembled parts together between electrodes bearing on opposite straps, passing a welding current between the electrodes and pressing them together so as to bring the recessed portions of the sheets into extended and intimate contact with the heating element and to fasten the parts together.

2. The method of making radiators of the character described which comprises forming metal sheets into a plurality of spaced corrugated sections and bending the edges of the corrugations at one side to form a series of recesses in longitudinal alinement, punching holes through the sheets at points adjacent to said recesses, applying straps to the sheets at the sides opposite to the recesses with tubular shaped welding projections on the straps extending through said holes, assembling two such sheets with their recesses facing each other and an elongated heating element between them extending longitudinally in said recesses, bringing the assembled parts together between electrodes bearing on opposite straps, passing a welding current between the electrodes and pressing them together so as to bring the recessed portions of the sheets into extended and intimate contact with the heating element and swaging the projections sufficiently to fill said holes and tightly fasten the parts together.

3. The method of making radiators of the character described which comprises forming metal sheets into spaced corrugated sections and bending the edges of the corrugations at one side to form a series of recesses in longitudinal alinement, applying to the sheets straps having recessed portions fitting over the recessed portions of the sheets, assembling two such sheets with their recesses facing each other and an elongated heating element between them extending longitudinally in said recesses, bringing the assembled parts together between electrodes bearing on opposite straps, passing a welding current between the electrodes and pressing them together so as to bring the recessed portions of the sheets into extended and intimate contact with the heating element and to fasten the parts together.

4. The method of making radiators of the character described which comprises in combination the following steps,—shaping metal sheets into a series of spaced open ended corrugated sections and bending the edges of the corrugations at one side to form a series of recesses in longitudinal alinement, performing said operations in successive steps along the length of the sheet, applying straps to the sheets at the sides opposite to the recesses, assembling two such sheets with their recesses facing each other and an elongated heating element between them extending longitudinally in said recesses, bringing the assembled parts together between electrodes bearing on opposite straps, passing a welding current between the electrodes and pressing them together so as to bring the recessed portions of the sheets into extended and intimate contact with the heating element and to fasten the parts together.

5. The method of making radiators of the character described which comprises shaping metal sheets into spaced corrugated sections and bending the edges of the corrugations at one side to form a series of recesses in longitudinal alinement, applying straps to the sheets at the sides opposite to the recesses, assembling two such sheets with their recesses facing each other and an elongated heating element between them extending longitudinally in said recesses, bringing the assembled parts together between electrodes bearing on opposite straps, passing a welding current between the electrodes and pressing them together so as to bring the recessed portions of the sheets into extended and intimate contact with the heating element and to fasten the parts together, performing said welding operation in successive steps along the length of the radiator.

6. The method of making radiators of the character described which comprises in combination the following steps,—folding the edges of thin metal sheets, forming spaced open ended corrugated sections therein transverse to the folded edges and bending the edges of the corrugations at one side to form a series of recesses in longitudinal alinement, applying straps to the sheets at the sides opposite to the recesses, assembling two such sheets with their recesses facing each other and an elongated heating element between them extending longitudinally in said recesses, bringing the assembled parts together between electrodes bearing on opposite straps, passing a welding current between the electrodes and pressing them together so as to bring the recessed portions of the sheets into extended and intimate contact with the heating element and to fasten the parts together.

7. The method of making radiators of the character described which comprises in combination the following steps,—forming metal sheets into spaced corrugated sections, bending the edges of the corrugations at one side to form a series of recesses in longitudinal alinement, applying straps to the sheets at the sides opposite to the recesses and deforming the sheets so as to hold said straps in place, assembling two such sheets with their recesses facing each other and an elongated heating element between them extending longitudinally in said recesses, bringing the assembled parts together between electrodes bearing on opposite straps, passing a welding current between the electrodes and pressing them together so as to bring the recessed portions of the sheets into extended and intimate contact with the heating element and to fasten the parts together.

8. The method of making radiators of the character described which comprises in combination the following steps,—forming metal sheets into spaced corrugated sections, bending the edges of the corrugations at one side to form a series of recesses in longitudinal alinement, applying straps to the sheets at the sides opposite to the recesses and deforming the sheets so as to hold said straps in place, assembling two such sheets with their recesses facing each other and an elongated heating element between them extending longitudinally in said recesses, bringing the assembled parts together and uniting the opposite straps so as to fasten all the parts together.

9. The method of making radiators of the character described which comprises forming metal sheets into spaced corrugated sections and bending the edges of the corrugations at one side to form a series of recesses in longitudinal alinement, applying straps to the sheets at the sides opposite to the recesses, assembling two such sheets with their recesses facing each other and an elongated heating element between them extending longitudinally in said recesses, bringing the assembled parts together and uniting the opposite straps so as to fasten all the parts together.

10. The method of making radiators of the character described which comprises forming metal sheets into spaced corrugated sections and bending the edges of the corregulations at one side to form a series of recesses in longitudinal alinement, punching holes through the sheets at points adjacent to said recesses, applying straps to the sheets at the sides opposite to the recesses with tubular shaped welding projections on the straps extending through said holes, assembling two such sheets with their recesses facing each other and an elongated heating element between them extending longitudinally in said recesses, bringing the assembled parts together and welding the projections of the opposite straps so as to fasten all the parts together.

11. The method of making radiators of the character described which comprises forming metal sheets into spaced corrugated sections and bending the edges of the corrugations at one side to form a series of recesses in longitudinal alinement, applying to the sheets straps having recessed portions fitting over the recessed portions of the sheets, assembling two such sheets with their recesses facing each other and an elongated heating element between them extending longitudinally in said recesses, bringing the assembled parts together between electrodes bearing on opposite straps and pressing the opposite straps together and uniting them so as to bring the recessed portions of the sheets into extended and intimate contact with the heating element and to fasten the parts together.

In witness whereof, I have hereunto signed my name.

THOMAS E. MURRAY, Jr.